March 24, 1936. W. G. STRATTON 2,034,842
SELF LOADING DEVICE FOR TRAILERS OF LOGGING TRUCKS
Filed Feb. 11, 1935 2 Sheets-Sheet 1
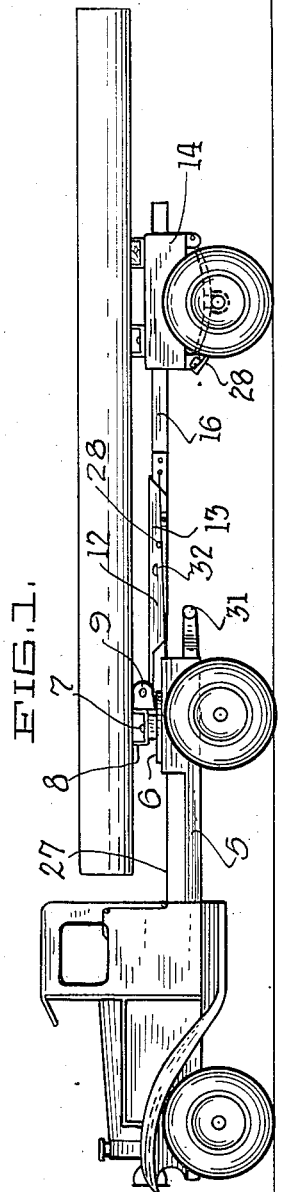
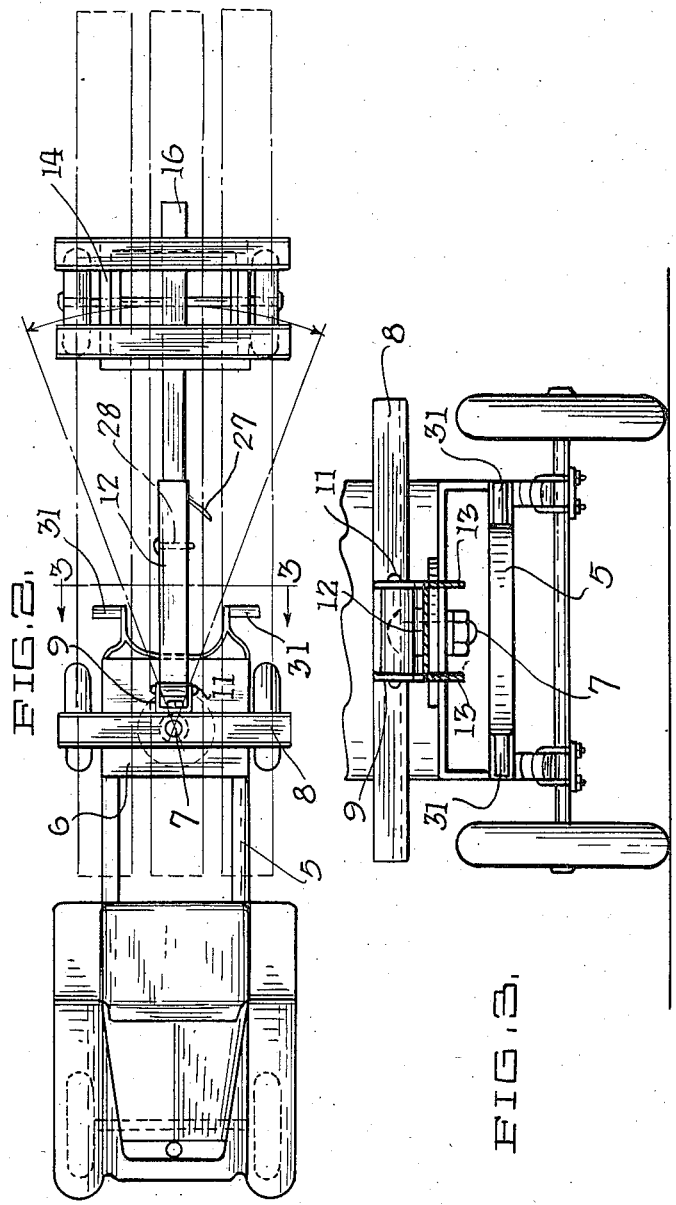
INVENTOR:
W. G. STRATTON
BY
ATTORNEYS.

March 24, 1936.  W. G. STRATTON  2,034,842
SELF LOADING DEVICE FOR TRAILERS OF LOGGING TRUCKS
Filed Feb. 11, 1935   2 Sheets-Sheet 2
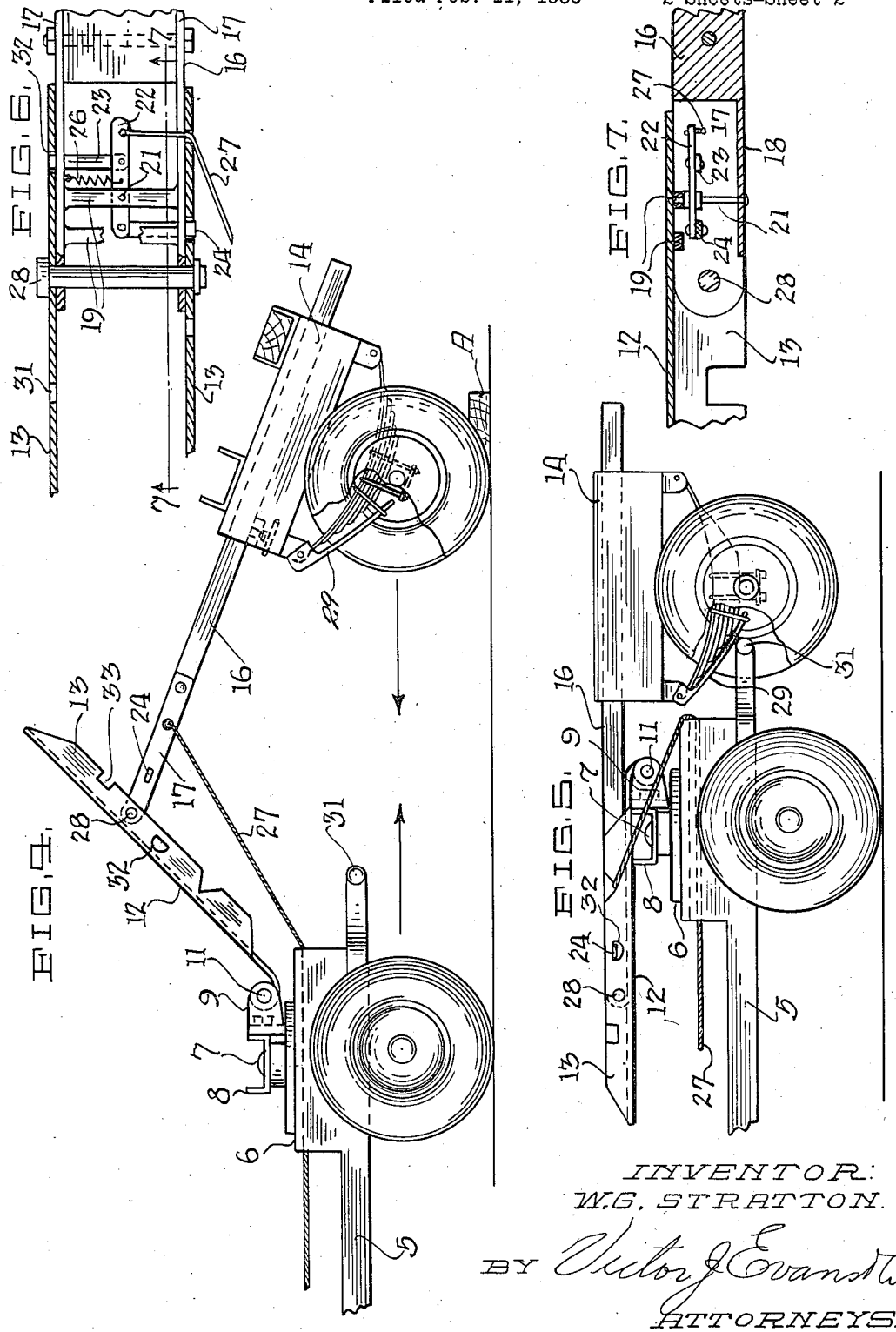
INVENTOR:
W.G. STRATTON.
BY
ATTORNEYS.

Patented Mar. 24, 1936

2,034,842

UNITED STATES PATENT OFFICE 2,034,842

SELF-LOADING DEVICE FOR TRAILERS OF LOGGING TRUCKS

William G. Stratton, Hilt, Calif.

Application February 11, 1935, Serial No. 6,037

3 Claims. (Cl. 214—65)

This invention relates to improvements in self-loading devices for trailers of logging trucks.

The principal object is to produce a logging truck trailer connection which will automatically effect a loading of the trailer onto its attached truck for return movement when the trailer is being returned empty to the point of loading.

Another object is to produce a device wherein the weight of the trailer automatically unloads the trailer from the truck when released.

A further object is to produce a device which may be actuated from the driver's compartment of the truck.

A still further object is to produce a device which is sturdy in construction, economical to manufacture and readily applicable to standard trucks and trailers.

Other objects and advantages will be apparent during the course of the following description.

In the accompanying drawings forming a part of this specification and in which like numerals are employed to designate like parts throughout the same, Fig. 1 is a side elevation of a truck and trailer having my invention applied thereto, Fig. 2 is a top plan view of Fig. 1, Fig. 3 is a cross sectional view on the line 3—3 of Fig. 2, Fig. 4 is a fragmentary view showing the manner in which the trailer connection hinges, Fig. 5 is a fragmentary view showing the trailer in loaded position on the truck, Fig. 6 is an enlarged detail view of the latch mechanism, and Fig. 7 is a cross sectional view taken on the line 7—7 of Fig. 6.

In the handling of long objects, such as logs, pipes, and the like, it is common to employ a two-wheel trailer connected to the truck by a tongue pivoted to a king-pin upon the rear of the truck. In this manner the long objects extend between the trailer and the truck and pivot about the king-pin on the truck. After unloading such trailers it is common practice to load the trailer on the truck for transportation back for a second load. This is usually accomplished by main force as these trailers are heavy and very unwieldly. Much breakage occurs through rough handling and injuries also result incidental to the manipulation. I have, therefore, devised an arrangement which obviates these difficulties.

Referring to Fig. 1, the numeral 5 designates the truck frame of standard construction, upon which I mount a platform 6 and to which is secured the king-pin 7. This construction is common and forms no part of my invention.

A bolster is shown at 8 to which I connect a yoke 9, which carries the pintle 11 of a hinged channel member 12. This channel member is so positioned that its webs 13 extend downwardly when in the position of Fig. 1. The numeral 14 designates a two-wheel trailer as a whole, to which is connected a tongue 16 and it is to this tongue that I attach a latch-box which consists of side plates 17 bolted or otherwise secured to the tongue 16 and projected therefrom. This latch-box has a bottom plate 18 and cross piece 19, which cross piece extends between the side plates 17. Extending between one of the cross pieces 19 and the bottom plate 18 is a pivot pin 21, to which a lever 22 is pivoted. This lever has bolts 23 and 24 connected thereto on opposite sides of the pivot 21. A spring 26 tends to normally keep these bolts projected through the plates 17 as will be later described.

A cable 27 is connected to the lever 22 in such a manner as to overcome the tension of the spring 26 so as to retract the bolts 23 and 24. This cable extends to the driver's compartment. A pivot pin 28 connects the latch box with the channel member 12. Secured to the trailer are plates 29 so arranged that they underlie the forward portion of the springs of the trailer, and are capable of engaging arms 31 secured to the rear of the trailer, the operation of which will be later seen. An opening 32 is formed on each side of the channel member, one forward of the pivot 28 and one rearward thereof, so that the bolts 23 and 24 will alternately engage these openings when the device is in open or closed position. Recesses 33 are formed in the channel 12 and in alignment with the opening 32 so that free movement of the respective bolts may take place in the manner to be described.

The operation of my device is as follows:—Assuming that the parts are in the position of Fig. 1, then the bolt 23 will be engaging its opening 32 (see Fig. 6), and consequently the hinged joint between the channel member and the tongue will be locked. Let us now assume that the load has been delivered and it is desired to move the trailer onto the truck, the operator pulls the cord 27 against the tension of the spring 26. This withdraws the bolt 23 from the opening 32 and it is to be here noted that the bolt 24 was at this time lying within one of the recesses 33. By now backing the truck and trailer against a chock A, which is below the axle of the trailer, the trailer will tip backwardly as illustrated in Fig. 3, breaking the joint and causing a folding action. This will bring the arms 31 into engagement with the plates 29 and cause a lifting action of the trailer. At this time the channel member will have moved to the position of Fig. 5 and the bolt 24 will move into its opening 32 and the bolt 23 will lie in its recess 33. When it is desired to unload the trailer, the operator merely pulls upon the cord 27 and the weight of the trailer which is unsupported will slide on the arms 31, causing the channel member and tongue to move from the position of Fig. 5 to that of Fig. 4 and then Fig. 1, where it will automatically lock into loading position.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In combination with a truck and a trailer having a tongue secured thereto, of a channel member pivotally secured to said truck and to said tongue, latching means connecting said tongue to said channel member, said latching means holding said tongue in parallel alignment with said channel member when moved above said pivot in either of two positions substantially 180° apart.

2. In combination with a truck and a trailer having a tongue secured thereto, of a channel member pivotally secured to said truck and to said tongue, latching means connecting said tongue to said channel member, said latching means holding said tongue in parallel alignment with said channel member when moved above said pivot in either of two positions substantially 180° apart, said latching means comprising a pair of bolts pivoted for simultaneous actuation and so positioned as to extend into the side webs of said channel mechanism.

3. In combination with a truck and a trailer having a tongue secured thereto, of a channel member pivotally secured to said truck and to said tongue, latching means connecting said tongue to said channel member, said latching means holding said tongue in parallel alignment with said channel member when moved above said pivot in either of two positions substantially 180° apart, said latching means comprising a pair of bolts pivoted for simultaneous actuation and so positioned as to extend into the side webs of said channel mechanism, and supporting means extending from said truck to underlie and support said trailer when said trailer is mounted on said truck.

WILLIAM G. STRATTON.